United States Patent Office 3,342,641
Patented Sept. 19, 1967

3,342,641
FUEL CELL WITH NEGATIVE PRESSURE MEANS
Friedrich Burhorn and Philipp Jäger, Erlangen, Germany, assignors to Siemens-Schuckertwerke Aktiengesellschaft, Berlin-Siemensstadt and Erlangen, Germany, a corporation of Germany
Filed Sept. 11, 1963, Ser. No. 308,132
Claims priority, application Germany, Sept. 12, 1962, S 81,412
4 Claims. (Cl. 136—86)

Our invention relates to fuel cells and has for its principal object to provide an improved fuel cell.

Generally, a fuel cell comprises an electrolyte, in which ion movement takes place, and which reacts electrochemically with a fuel gas and with an oxidizing gas respectively filling the pores of two gas diffusion electrodes, anode and cathode, between which the electrolyte is sandwiched In such an arrangement, the reaction occurs partly with the electrolyte and partly with the gas filled pores, and thus depends upon the existence of so-called three-phase borders constituted by the borders between the pore walls, the gas and the liquid.

For an electrode to function properly it is essential to compensate the capillary pressure in the pores which would otherwise fill the electrolyte and become electrochemically inoperative. Generally this is accomplished by applying from the outside of the electrode, a gas pressure exceeding the atmospheric pressure. Thus generally the gases applied to the electrodes are compressed by means which must expend energy thus diminishing the net energy output of the cell. Also if the gas pressure in the pores exceeds a maximum value, the reaction gas bubbles unused through the liquid electrolyte and no three-phase border can form. While with carbon electrodes it is nevertheless possible to produce a three-phase border even at atmospheric pressures by making the carbon hydrophobic, this is not possible with metal electrodes.

Another object of the present invention is to provide an improved fuel cell system, particularly one obviating the above-mentioned difficulties.

Still another object of the invention is to provide a fuel cell which eliminates the space and/or energy required by the compression system and yet is capable of using metal electrodes.

According to a feature of our invention we eliminate the above-mentioned difficulties in a fuel cell by subjecting the electrolyte side of the gas-diffusion electrode to a negative pressure. According to another feature of our invention for the above purpose we render the electrolyte space vacuum tight with an apparatus for producing the negative pressure. We produce the negative pressure by the usual methods for example by evacuating an air space continguous with the electrolyte space. The thus produced vacuum is then measured and controlled to accommodate the conditions for fuel flow. If the negative pressure is to be held constant during the progressive dilution of the electrolyte we preferably utilize a weight to produce the constant negative pressure.

Other objects and advantages of the invention will become obvious from the following detailed description of several embodiments thereof when read in light of the accompanying drawing wherein.

Figure 1:
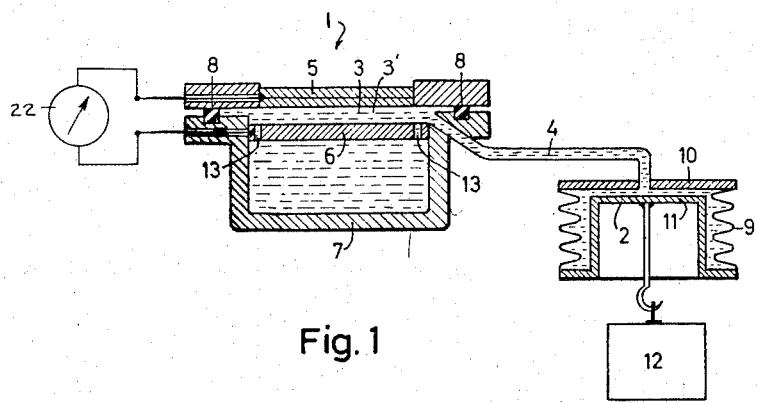
FIG. 1 is a cross-sectional view of a fuel cell embodying features of the invention.

In FIG. 1 a fuel cell generally designated 1 consists of a gas diffusion electrode 5 and a fuel electrode 6, sandwiching an electrolyte 3 in a space 3' which communicates through the tube 4 to a negative pressure chamber 2. The oxidation electrode 5 is a multi-layer electrode composed of a gas-conducting layer, a coarse pore operating layer and a fine pore cover layer. The electrolyte is composed of 6 N potassium leach which has admixed as a fuel material ethyl alcohol. An electrode reservoir 7 connects with the electrolyte space 3' by means of openings 13 is electrode 6. A packing ring 8 sandwiched between two flanges extending respectively from the gas-diffusional electrode 5 and the electrolyte reservoir 7 heremetically seals the electrolyte space 3'. The negative pressure chamber 2 comprises a vertically positioned elastic bellows 9 enclosed on the top and bottom ends by metal plates 10 and 11. The elastic spring bellows are composed of nickel-chromium steel with a lower surface of 20 square centimeters having a length of 5 centimeters with a possible extension of approximately 4 centimeters. The space 3', electrolyte reservoir 7 and the negative pressure chamber 2 as well as the tube 4 are completely filled with electrolyte fluid 3. At 10 kg. weight 12 depending from the underside of plate 11 at the end of the negative pressure chamber produces a predetermined negative pressure in the collective electrolyte spaces. If the electrolyte volume increases during the electrolytic reaction due to water formation only the spring bellows 9 expands, the weight 12 lowers somewhat, and the negative pressure remains constant. Adjustment of the electrolyte concentration in space 3' occurs through the openings 13. The apparatus preferably is arranged volumetrically so that the negative pressure remains constant until it is necessary to change the electrolyte. Changes in the ambient air pressure do not influence the pressure difference between the outer pressure and the electrolyte pressure. The cell 1 produces a current strength of 250 ampere hours and also produces approximately 85 cubic centimeters of water.

Figure 2:
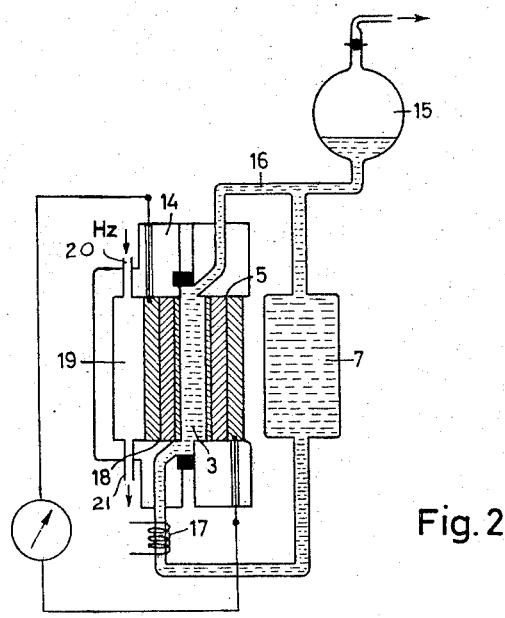
FIG. 2 is a cross-sectional schematic representation of another embodiment of a fuel cell system according to the invention.

In FIG. 2 showing another schematic embodiment according to the invention, the fuel cell 14 connects with a pumped-out air space 15 by means of an electrolyte circuit path 16. Electrolyte flow, and therefore the adjustment of the electrolyte concentration between the electrolyte space 3' and the electrolyte reservoir 7, is effected by convection forces. If the heat furnished by the fuel cell during reaction is not sufficient for convection, supplemental heating of the electrolyte preferably is accomplished by a heating element 17. A gas diffusion electrode 18, serving as the fuel electrode of the fuel cell 14 passes the fuel gas from a gas chamber 19, which possesses two openings 20 and 21 for inlet and outlet of the gas. The electrode 5 is an air-oxidizing electrode as is also the case in FIG. 1.

The invention affords use of gases, for example air under atmospheric pressure, with metal electrodes, for example DSK-electrodes. The fuel is usable in gaseous or liquid form. The danger of soaking through the electrode which exists with conventional carbon-diffusion electrode is thus obviated.

The cell according to the invention preferably operating with an air-oxidizing electrode and fluid fuel affords a maintenance-free operation. The negative pressure chamber, because of the limited compressibility of fluids produces a limited volumetric extension as compared to that produced by a compression chamber serving the same purpose for gases. Thus the invention affords a fuel cell of relatively small and compact construction.

The fuel cell according to the invention otherwise operates electrochemically in the usual manner, producing a voltage drop between the electrodes 5 and 6 so as to energize a load 22 shown in FIGS. 1 and 2 to be a voltmeter. Operation of fuel cells generally and gas diffusion electrodes are discussed in the copending applications Ser. No. 219,681, filed Aug. 27, 1962 and Ser. No. 298,-

958, filed July 31, 1963, now abandoned, and assigned to the assignee of this application. The disclosures therein are made a part of this application.

Fuel cells are also discussed generally as to operation in the periodical Chemical and Engineering News Dec. 5, 1960, page 56, published by the American Chemical Society.

The materials and other parameters given in the description of the embodiments above are only exemplary. It will be obvious to those skilled in the art that the invention may be practiced otherwise without departing from its spirit and scope.

We claim:

1. A fuel cell system comprising two electrode means one of which is of the gas diffusion type, an electrolyte contacting each electrode means, said two electrode means being exposable to a fuel and an oxidizing gas respectively, and vacuum forming means connected with said electrolyte for subjecting the electrolyte to a negative pressure, said vacuum forming means including an acid-resistant and alkali-resistant elastic chamber having expansible walls so as to be expandable to a specific volume and force means for applying to the walls a constant expanding force.

2. A fuel cell system comprising two electrode means one of which is of the gas diffusion type, electrolyte container means for holding an electrolyte in contact with said electrode means, said two electrode means being exposable to a fuel and an oxidizing gas respectively, and vacuum forming means connected with said electrolyte container means for subjecting the electrolyte in the container means to a negative pressure, said vacuum forming means including an acid-resistant and alkali-resistant elastic chamber having expansible walls so as to be expandable to a specific volume and force means for applying to the walls a constant expanding force, said chamber and said container means being completely filled with electrolyte.

3. A fuel cell system comprising two electrode means one of which is of the gas diffusion type, electrolyte container means for holding an electrolyte in contact with said electrode means, said two electrode means being exposable to a fuel and an oxidizing gas respectively, and vacuum forming means connected with said electrolyte container means for subjecting the electrolyte in the container means to a negative pressure, said vacuum forming means having an expansible bellows with metal end plates.

4. A fuel cell system comprising two electrode means one of which is of the gas diffusion type, electrolyte container means for holding an electrolyte in contact with said electrode means, said two electrode means being exposable to a fuel and an oxidizing gas respectively, and vacuum forming means connected with said electrolyte container means for subjecting the electrolyte in the container means to a negative pressure, said vacuum forming means having an expansible bellows with metal end plates and a weight connected to one end plate for drawing it downwardly and thus expanding the bellows.

References Cited

UNITED STATES PATENTS

| | | | |
|---|---|---|---|
| 963,852 | 7/1910 | Benko | 136—86 |
| 1,932,666 | 10/1933 | Hyatt | 136—30 |
| 1,959,889 | 5/1934 | Wunsch. | |
| 3,002,039 | 9/1961 | Bacon | 136—86 |
| 3,014,976 | 12/1961 | Blackmer | 136—86 |

OTHER REFERENCES

Regenerative Fuel Cell System, ASTIA, as AD No. 277,805, July 17, 1962 (only pp. 17, 23, 24, 25, 122 relied on).

ALLEN B. CURTIS, *Primary Examiner.*

WINSTON A. DOUGLAS, *Examiner.*